United States Patent
Woehrle

(10) Patent No.: US 6,997,052 B2
(45) Date of Patent: Feb. 14, 2006

(54) VIBRATION LEVEL SENSOR

(75) Inventor: Siegbert Woehrle, Schiltach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/664,254

(22) Filed: Sep. 17, 2003

(65) Prior Publication Data

US 2004/0244481 A1    Dec. 9, 2004

(30) Foreign Application Priority Data

Sep. 17, 2002    (DE) ............................... 102 42 970

(51) Int. Cl.
*G01F 23/00*    (2006.01)
(52) U.S. Cl. .................. 73/290 V; 73/290 R
(58) Field of Classification Search ............. 73/290 V, 73/290 R
See application file for complete search history.

(56) References Cited

U.S. PATENT DOCUMENTS

| 5,895,848 A | 4/1999 | Wilson et al. ................ 73/290 |
| 6,389,891 B1 | 5/2002 | D'Angelico et al. .......... 73/290 |

FOREIGN PATENT DOCUMENTS

| DE | 30 44 354 | 3/1982 |
| DE | 198 35 370 | 10/2000 |

*Primary Examiner*—Hezron Williams
*Assistant Examiner*—Rodney Frank
(74) *Attorney, Agent, or Firm*—Nath & Associates PLLC; Gregory B. Kang; Derek Richmond

(57) ABSTRACT

A filling level sensor comprises a tunable electrical resonant circuit, a mechanical oscillator that can be excited to resonance oscillation by the resonant circuit, and a control circuit for tuning the resonant circuit to a resonance frequency of the mechanical oscillator. A device for comparing the amplitude of the mechanical oscillator with a minimum value ascertains a malfunction of the mechanical oscillator if its amplitude falls below the minimum value.

20 Claims, 5 Drawing Sheets

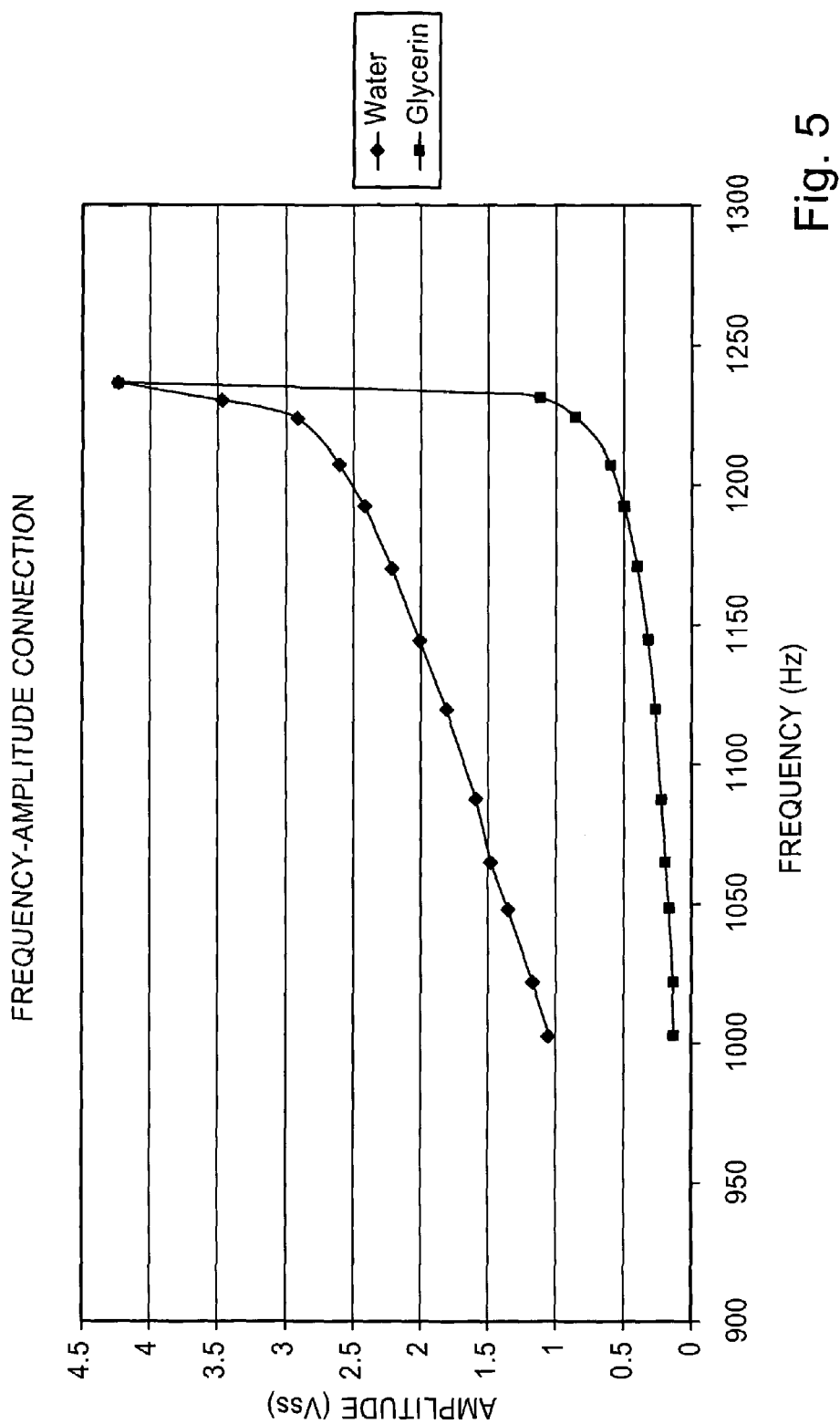

VIBRATION LEVEL SENSOR

CROSS REFERENCE TO RELATED APPLICATIONS

This application claims foreign priority under 35 U.S.C. §119 to German Patent Application Serial No. 102 42 970.7 filed Sep. 17, 2002, the entirety of which is hereby incorporated by reference herein.

FIELD OF THE INVENTION

The present invention relates to a filling level sensor with a tunable electrical resonant circuit, a mechanical oscillator that can be excited by the resonant circuit to tune the resonance and a control circuit for tuning the resonant circuit to a resonance frequency of the mechanical oscillator.

BACKGROUND OF THE INVENTION

A filling level sensor in the field of this invention is known from U.S. Pat. No. 5,895,848 and from German Patent DE 44 39 879 C1.

The functional principle of such a filling level sensor rests on the fact that the resonance frequency of the mechanical oscillator changes depending upon the density and, to a slight degree, upon the viscosity of a medium in which the oscillator is immersed.

The electrical resonant circuit of such a filling level sensor must be tunable within the limits of the anticipated resonance frequencies of the mechanical oscillator. When starting the filling level sensor, beginning with an initial frequency, the electrical resonant circuit is tuned to various frequencies in order to determine the current resonance frequency of the mechanical oscillator. A resonance frequency is then regarded as having been found if a 90° difference of phase is found between the phase of a motive force acting upon the mechanical oscillator and the movement of the oscillator. If no such frequency is found within the tuning range, it is assumed that the mechanical oscillator is blocked, e.g. by contact with a foreign object, and a malfunction of the filling level sensor is recognized.

The principle of error recognition will also fail if the tuning fork is detuned as a result of deposits on the tuning fork or mechanical damage to the tuning fork (as a result of erosion of the fork's tines, for example). In that case, the frequency that corresponds to this portion of the spectrum is detected as a resonance frequency of the mechanical oscillator. Its dependency upon the density and viscosity of the medium surrounding the mechanical oscillator can, however, be completely different in nature than that of an unhampered oscillator, making reliable monitoring of the filling level impossible.

In order to be able to operate a filling level sensor of the type alluded to at the outset, with various tuning fork oscillators that have different resonance frequencies, the oscillator must have a wide tuning range available. (Different resonance frequencies are caused by different tuning fork geometries or coatings, such as enamel, for example.) On the other hand, the probability that the oscillation of an oscillator whose movement is restricted exhibits a spectral component within the tuning range is all the greater the greater this tuning range is. This means the greater the distance between the frequencies of the individual oscillators for which such an oscillator may be used, the greater the risk that a partial blockage of the oscillator will remain undetected and that the filling level sensor could possibly provide false readings.

SUMMARY OF THE INVENTION

The object of the present invention is to create a filling level sensor in which the risk of locking onto an unsuitable frequency in the event of a partial blockage of the oscillator is diminished. A further object consists of recognizing when a false frequency has been locked onto as a result of mechanical damage to the oscillator, deposits on the oscillator, short circuit, or breakage of a line. In such cases, an error report should be transmitted.

The object is achieved by means of a filling level sensor with the characteristics of claim 1. Since the amplitude of the oscillator's oscillation will generally be clearly reduced in the case of a partial blockage of, deposit on, or damage to the oscillator, monitoring this amplitude makes it possible to assess whether or not a resonance frequency that was found is the "true" resonance frequency of the unhampered oscillator.

In one specific embodiment, the oscillator's amplitude is detected using a peak value rectifier, for example, and read through an analog-to-digital (A/D) converter into a microprocessor ($\mu$P). A plausibility check occurs in the latter. An examination occurs to determine whether the measured amplitude for the individual frequency of oscillation corresponds to a normal operating state, or whether a malfunction of the type mentioned above exists.

In another embodiment, a Schmitt trigger can serve as a threshold circuit, whereby the Schmitt trigger's switching threshold corresponds to the minimum value of the amplitude.

The electrical resonant circuit is preferably connected to an electro-mechanical transducer that drives the mechanical oscillator by way of a low-pass filter. The task of this low-pass filter is to render the oscillating driving voltage fed into the electro-mechanical transducer as low as possible in terms of harmonic oscillations, thus exciting a movement of the oscillator that is, in turn, low in harmonics, sum frequencies, and difference frequencies. The suppression of the difference of frequency components is especially important because the possibility exists, in the case of the latter, that they could fall within the tuning range of the resonant circuit, and therefore be detected as resonance of the mechanical oscillator.

If the electro-mechanical transducer is a piezo element, the low-pass filter can be formed very simply by a resistor wired in series with the piezo element and the piezo element's naturally intrinsic capacitance.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 5 shows, by way of example, a diagram in which the relation between frequency and amplitude may be seen for various filling media.

DETAILED DESCRIPTION OF SPECIFIC EMBODIMENTS

Figure 1:
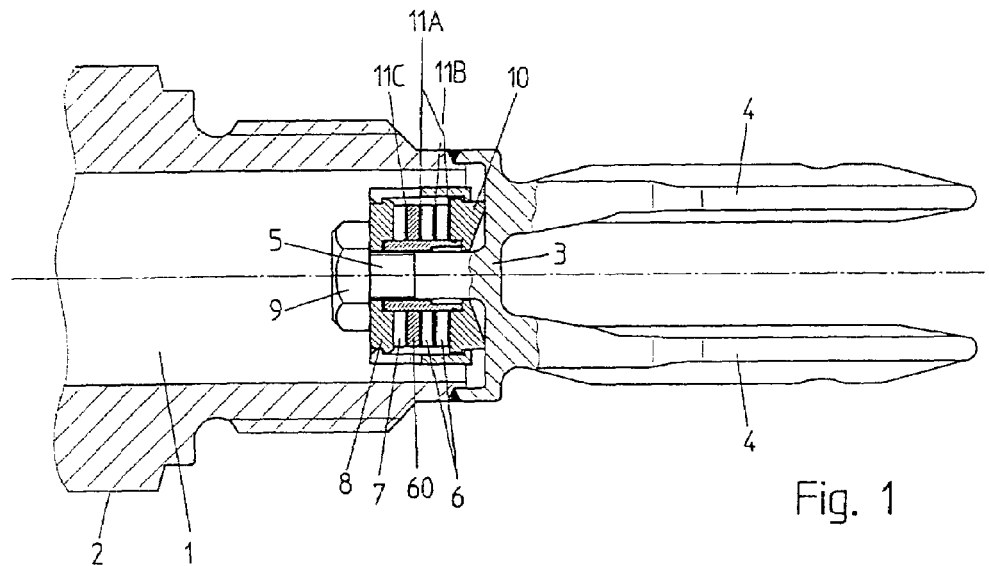
FIG. 1 shows a section through a measuring head of a filling level sensor according to the invention.

The measuring head shown in FIG. 1 is comprised of an insertable metallic housing 1, substantially beaker-shaped, which bears external threading 2 for screwing into an opening of a tank in which the filling level of a fluid is to be monitored. The bottom of the beaker is comprised of a membrane 3 that is capable of vibrating and bears two tuning fork tines 4 on its exterior, which is pointed into the interior of the tank, and a tie bolt 5 on its interior. Two piezo elements 6, 7 are arranged in the form of a ring around tie bolt 5. In order to achieve a higher transmission amplitude, piezo element 6 consists of two parallel-wired piezo rings that are separated by a metallic ring 111B. Piezo elements 6, 7 are pressed against a support ring 10, which is in direct contact with membrane 3, by a thrust collar 8 and a nut 9 that is screwed onto tie bolt 5. The electrical separation of piezo elements 6,7, which function as transmitter and receiver, is accomplished by means of a ceramic ring 60. A metallic ring 11c, which constitutes the first electrode for piezo element 7, is positioned between ceramic ring 60 and piezo element 7. Metallic ring 11B constitutes the first electrode for piezo element 6. Thrust collar 8 and support ring 10 are connected electrically by way of tie bolt 5 and, with metallic ring 11A, which lies between ceramic ring 60 and piezo element 6, form a commonly shared second electrode.

Figure 2:
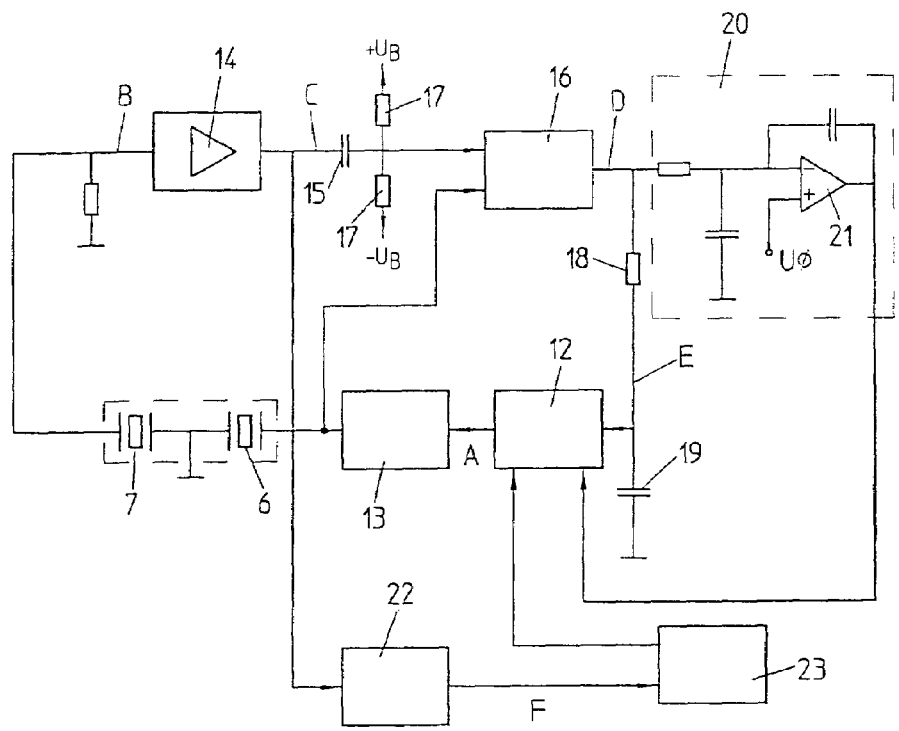
FIG. 2 shows a block circuit diagram of the electrical components of the filling level sensor, in which the amplitude monitoring is done by a Schmitt trigger.

FIG. 2 shows a block diagram of the filling level sensor's electronic components. The measuring head with piezo elements 6, 7 is represented here by broken lines as a rectangle. Piezo element 6, which serves as the exciter for the oscillation of the measuring head, is controlled by a voltage-controlled oscillator 12 by way of a pulse shaper 13, which smooths the harmonics-rich rectangular signal A of oscillator 12, thus reducing its proportion of harmonics. In the simplest case, the pulse shaper can be a simple resistor that works in series with the capacity of the piezo element 6 as a low-pass filter.

Figure 3A:
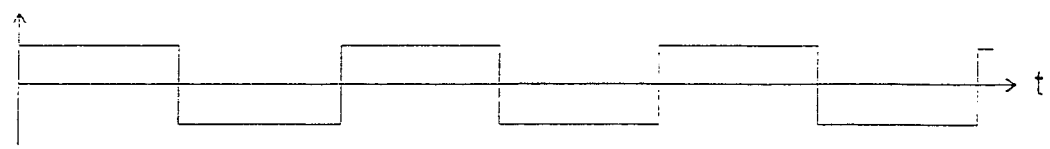
FIG. 3 shows the progress of signals over time at various points of the circuit from FIG. 2.
Figure 3B:
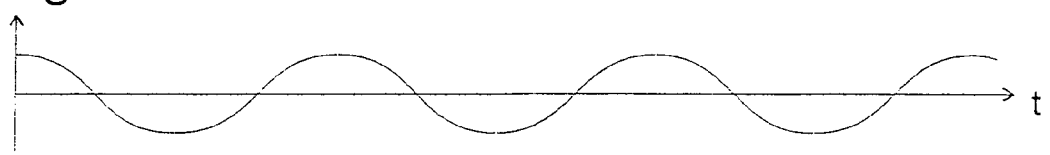

Piezo element 7 serves as a mechanical-electrical transducer that supplies a signal B, shown in FIG. 3B, that is proportional to the oscillation amplitude of tuning fork tines 4, to the entrance of an amplifier 14.

Figure 3C:
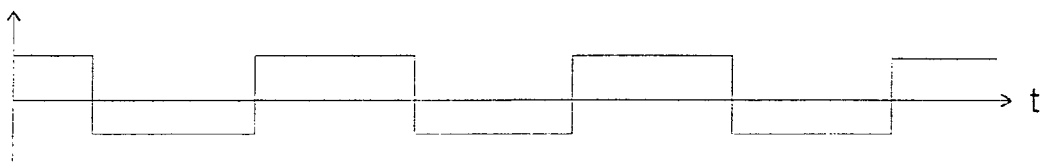

A slight oscillation amplitude of the mechanical oscillator suffices to make signal B strong enough to saturate the amplifier 14 essentially continuously, apart from zero crossings where the polarity of the signal changes. Therefore, amplifier 14 provides a rectangular output signal C, which is shown in FIG. 3C.

The output of amplifier 14 is connected to a first input of a phase detector 16 by way of a capacitor 15. Capacitor 15, as well as two resistors 17, which connect the first input of phase detector 16 with a positive and a negative distribution voltage, +UB, −UB, serve to suppress any constant voltage component possibly contained in signal C which could result from electromagnetic disturbances affecting the measuring head or the long line connections that might exist between the measuring head and the phase detector 16. This makes it possible to use a simple phase detector 16, which merely evaluates changes in the polarity of its input signals.

Figure 3D:
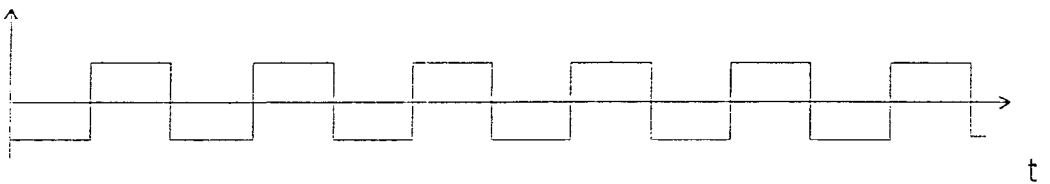

The second input of phase detector 16 is connected to the output of pulse shaper 13. Phase detector 16 supplies the output signal D shown in FIG. 3D, which changes its sign with every sign change of the two input signals. The relative length of the positive and negative impulses of rectangular signal D depends upon the relative phase relationship of signals A, C; in the event of a 90° shift in phase, as represented in FIG. 3A, 3C, positive and negative impulses are of equal length.

Figure 3E:
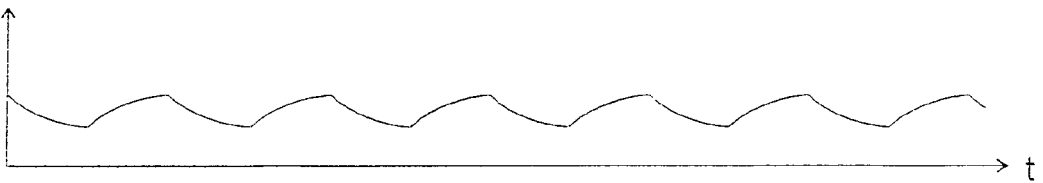
Figure 3C:
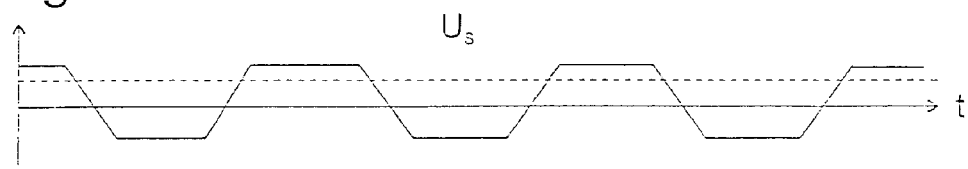

The output signal is directed to an input of voltage-controlled oscillator 12 by way of an RC network consisting of a resistor 18 connected between the output of phase detector 16 and a controlling input of voltage-controlled oscillator 12 and to a capacitor 19 that is connected with the controlling input, and with the frame, so that signal E, which is applied to the input of voltage-controlled oscillator 12, exhibits the progression shown in FIG. 3E. The phase detector 16 and the voltage-controlled oscillator 12, thus form a phase-locked loop or PLL.

The phase regulator 20, which is surrounded by a box drawn with a broken line in FIG. 2, is optional. It comprises an operational amplifier 21 connected as a comparator, to whose inverting input the output signal D of phase detector 16 is conducted by way of an RC network, and to whose non-inverting input an adjustable reference voltage, UM is applied.

With the aid of the reference voltage UF, the phase angle between the signals A, C can be prescribed. The output signal of comparator 21 is additively superimposed with signal E at voltage-controlled oscillator 12. That is, phase regulator 20 shifts the operating point of voltage-controlled oscillator 12 in such a manner that the phase angle between the signals A and C remains constant. As a result of working toward a constant phase angle, differences in the shift point of filling media having different viscosities can be evened out. Furthermore, thermal influences that change the range of settings of voltage-controlled oscillator 12 are also compensated by these means.

Signal C, emitted by amplifier 14, is applied, furthermore, to the input of a Schmitt trigger 22, whose output is in turn connected to an input of a microprocessor 23. The Schmitt trigger supplies a binary output signal that can be directly processed by the microprocessor. If the measuring head is in resonance, signal B, supplied by piezo element 7, is so strong that it keeps amplifier 14 saturated essentially continuously so that its output signal has the rectangular signal progression seen in FIG. 3C.

If the amplitude of signal B is weaker, amplifier 14 does not go into saturation, or it does so only for a portion of the oscillation cycle, so that its output signal assumes the progression shown in FIG. 3C'. The threshold Us of the Schmitt trigger is represented by a broken line in FIG. 3C'. Only if the output signal of amplifier 14 exceeds this threshold does the Schmitt trigger 22 provide an output signal F that does not disappear.

Figure 3F:
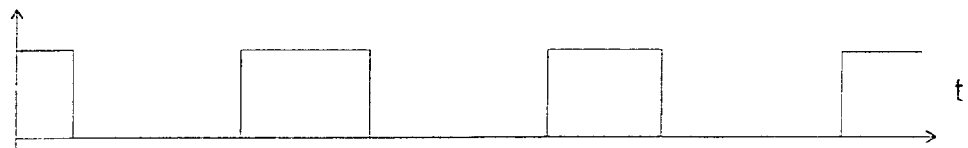

The progression of the output signal F of Schmitt trigger 22, which corresponds to signal C shown in FIG. 3C', is shown in FIG. 3F.

The duration of the positive impulses of the output signal F is all the shorter the less the oscillating amplitude of the measuring head, and if the latter is so weak that signal C does not reach threshold Us, signal F is constant at 0.

In order to detect signal F's duty cycle, microprocessor 23, which has a fixed clock cycle that does not stand in any integral ratio to the oscillation cycle, reads signal F, which is applied to its input. The incidence with which a non-disappearing level is read corresponds to the duty cycle. If this incidence lies beneath a prescribed value, which a user can adjust through microprocessor 23, the microprocessor provides a warning signal to that effect to a display apparatus or to an apparatus for further processing. From the existence of the warning signal, it is possible to conclude that either the PLL has not yet locked onto the measurement head's resonance frequency, or that a mechanical malfunction of the measurement head exists. Such a mechanical malfunction should be assumed especially if the warning signal is produced longer than the time needed to tune oscillator 12 across its variable tuning range.

If the duty cycle of signal F lies above the prescribed limit, it must be assumed that the oscillator 12 has locked onto the resonance frequency of the measurement head. In this case, microprocessor 23 reads the resonance frequency of oscillator 12 and passes it on to the display apparatus or to the apparatus that does further processing.

By reading in the frequency by way of a Schmitt trigger, it is only possible to assess whether the amplitude lies above a certain threshold. To be able to undertake a better assessment of the measurement, it is useful to know the exact extent of the oscillation amplitude. For that reason, the frequency and amplitude should be measured separately. The frequency can be detected at the VCO outlet. This is possible using the circuit from FIG. 4.

The amplitude is measured right at the receiving piezo. Using a peak value rectifier, the extent of the amplitude is detected and read into a IP by way of an A/D converter.

In the µP, the amplitude at each individual frequency is checked. If the filling medium measured in a facility is always the same, it is conceivable to store frequency and amplitude data for various degrees of coverage. In this way, a curve is obtained, which shows the progression of amplitudes depending upon the frequency. Thus during operation, amplitude and frequency can be compared again and again with the recorded values. In this way, minor changes in the measuring equipment can also be recognized.

Figure 4:
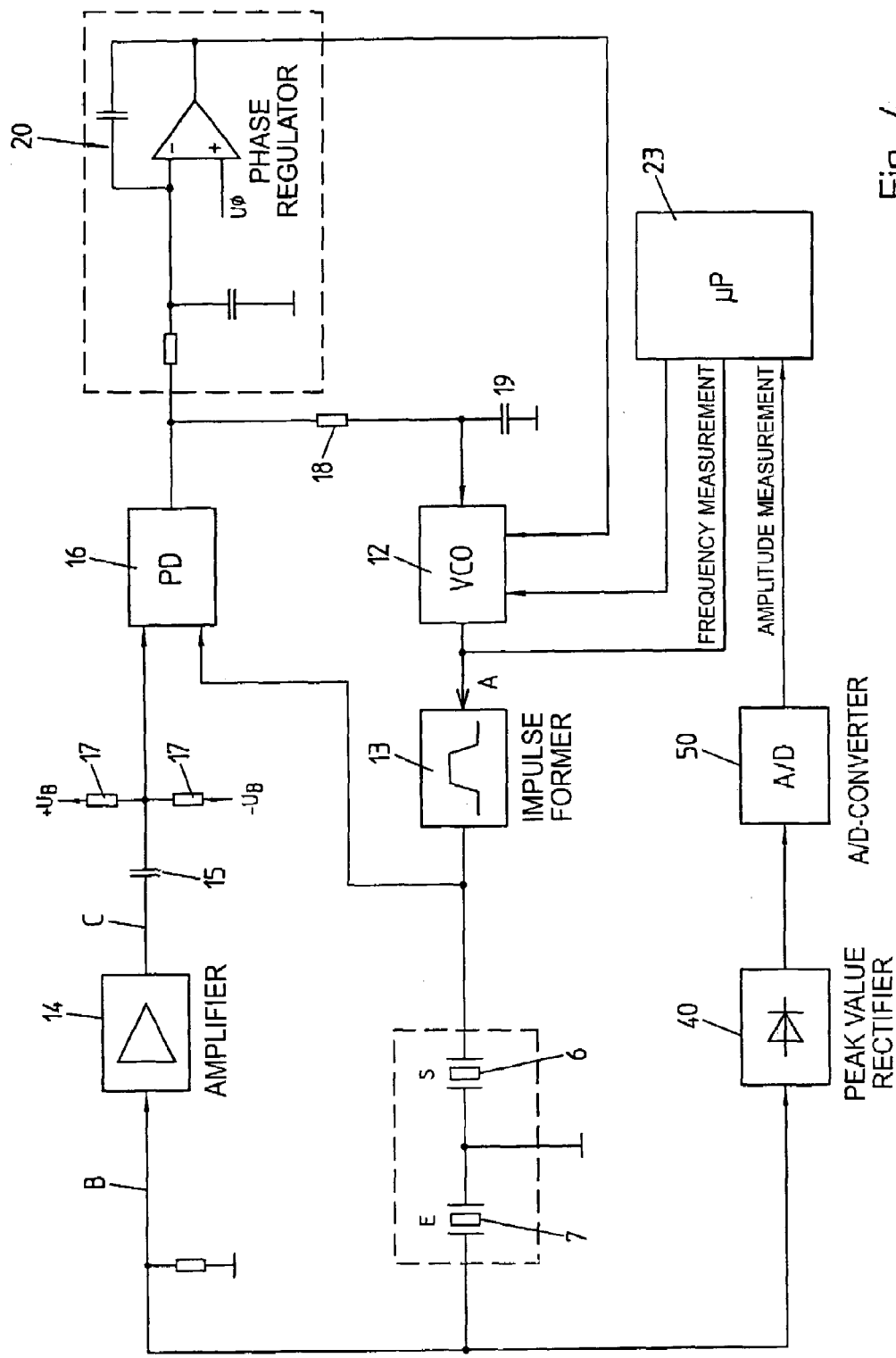
FIG. 4 shows a second block circuit diagram, similar to FIG. 2, but the amplitude monitoring is done by a peak value rectifier and A/D converter coupled to the μP.

In FIG. 4, a circuitry diagram similar to the one in FIG. 2 is shown, albeit without Schmitt trigger 22. A peak value rectifier 40 and A/D converter 50 are provided in its place. The input of peak value rectifier 40 is connected to the connection point of amplifier 14 and piezo element 7. The output of peak value rectifier 40 is connected to the input of A/D converter 50. The output of A/D converter 50 is connected to the input of microprocessor 23. A/D converter 50 can also be directly integrated into microprocessor 23. Microprocessor 23 can undertake a measurement of amplitudes. Within microprocessor 23, a frequency measurement can occur by virtue of the fact that the output of VCO 12 is also connected to an input of microprocessor 23. In other respects, the block circuitry diagram in FIG. 4 corresponds to that in FIG. 2.

With the arrangement according to the invention, a plausibility test is possible, by means of which it is detected whether errors are occurring in the filling level detection system. For example, the amplitude of the oscillations can decrease if the tuning fork exhibits adhesions of the pouring medium. If the tuning fork is fouled, the amplitude decreases. This can be detected using the circuit according to the invention.

Furthermore, mechanical damage to the tuning fork caused, for example, by erosion of the fork's tines, can be detected. If material is worn away on the tuning fork's tines, the frequency of the tuning fork increases. Without monitoring, this would indicate a decline in the filling level. Due to the fact that the amplitude of the tuning fork would not change to the same degree if the tuning fork's tines were eroded as it would if the filling level declined, a different amplitude-frequency ratio is to be expected in each case. Now, if the amplitude-frequency ratio is compared with the correct ratio stored in memory when the tank was filled for the first time, this erroneous condition can clearly be detected.

Furthermore, by using the arrangement of circuitry according to the invention, it is also possible to detect whether the "right" filling medium is being filled into the tank. To this end, the tank is slowly filled up, beforehand, with the "right" filling medium, and the amplitude, depending upon the frequency, is stored in memory. In so doing, e.g. for the filling medium water, the progression depicted at the top in FIG. 5 can result. This progression will be advantageously stored as a reference sample in the arrangement according to the invention. If, instead of the filling medium water, the filling medium glycerin is put in, which exhibits a considerably higher viscosity than water, a certain progression of the frequency-amplitude results of the oscillation signal. However, the ratio of amplitude to frequency is clearly less when the tuning fork is in its covered state. The pertinent progression may be recognized in the lower curve in FIG. 5.

Thus, with the arrangement according to the invention, the nature of the filling medium can be determined with certainty.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A filling level sensor comprising
   a tunable electrical resonant circuit,
   a mechanical oscillator that can be excited to resonance oscillation by the resonant circuit, and
   a control circuit for tuning the resonant circuit to a resonance frequency of the mechanical oscillator, comprising a device for comparing the amplitude and frequency of the mechanical oscillator with a value, and for detecting a malfunction of the mechanical oscillator if its amplitude and frequency deviates from this value in the prescribed manner.

2. A filling level sensor according to claim 1, wherein the control circuit comprises a PLL.

3. A filling level sensor according to claim 1 or 2, further comprising a mechanical-electrical transducer for the purpose of providing a signal proportional to the amplitude of the mechanical oscillator, and wherein the device for comparing comprises a threshold circuit, which receives the signal supplied by the transducer and suppresses it if its amplitude falls below the minimum value.

4. A filling level sensor according to claim 3, wherein the threshold circuit is a Schmitt trigger.

5. A filling level sensor according to claim 1, further comprising a mechanical-electrical transducer for supplying a signal that is proportional to the amplitude of the mechanical oscillator to the control circuit by way of a signal line and further comprising a high-pass filter positioned between the transducer and the control circuit in the signal line.

6. A filling level sensor according to claim 2, further comprising a mechanical-electrical transducer for supplying a signal that is proportional to the amplitude of the mechanical oscillator to the control circuit by way of a signal line and further comprising a high-pass filter positioned between the transducer and the control circuit in the signal line.

7. A filling level sensor according to claim 3, further comprising a mechanical-electrical transducer for supplying a signal that is proportional to the amplitude of the mechanical oscillator to the control circuit by way of a signal line and further comprising a high-pass filter positioned between the transducer and the control circuit in the signal line.

8. A filling level sensor according to claim 4, further comprising a mechanical-electrical transducer for supplying a signal that is proportional to the amplitude of the mechanical oscillator to the control circuit by way of a signal line and further comprising a high-pass filter positioned between the transducer and the control circuit in the signal line.

9. A filling level sensor according to claim 1, wherein the electrical resonant circuit is connected to an electrical-mechanical transducer that drives the mechanical oscillator by way of a low-pass filter.

10. A filling level sensor according to claim 2, wherein the electrical resonant circuit is connected to an electrical-mechanical transducer that drives the mechanical oscillator by way of a low-pass filter.

11. A filling level sensor according to claim 3, wherein the electrical resonant circuit is connected to an electrical-mechanical transducer that drives the mechanical oscillator by way of a low-pass filter.

12. A filling level sensor according to claim 4, wherein the electrical resonant circuit is connected to an electrical-mechanical transducer that drives the mechanical oscillator by way of a low-pass filter.

13. A filling level sensor according to claim 5, wherein the electrical resonant circuit is connected to an electrical-mechanical transducer that drives the mechanical oscillator by way of a low-pass filter.

14. A filling level sensor according to claim 9, wherein the electrical-mechanical transducer is a piezo element and the low-pass filter is formed by a resistor wired in series to the piezo element and the intrinsic capacity of the piezo element.

15. A filling level sensor according to claim 10, wherein the electrical-mechanical transducer is a piezo element and the low-pass filter is formed by a resistor wired in series to the piezo element and the intrinsic capacity of the piezo element.

16. A filling level sensor according to claim 11, wherein the electrical-mechanical transducer is a piezo element and the low-pass filter is formed by a resistor wired in series to the piezo element and the intrinsic capacity of the piezo element.

17. A filling level sensor according to claim 12, wherein the electrical-mechanical transducer is a piezo element and the low-pass filter is formed by a resistor wired in series to the piezo element and the intrinsic capacity of the piezo element.

18. A filling level sensor according to claim 13, wherein the electrical-mechanical transducer is a piezo element and the low-pass filter is formed by a resistor wired in series to the piezo element and the intrinsic capacity of the piezo element.

19. A process for detecting a malfunction in a filling level measurement system with a filling level sensor comprising a tunable electrical resonant circuit, a mechanical oscillator that can be excited to resonance oscillation by the resonant circuit, and a control circuit for tuning the resonant circuit to a resonance frequency of the mechanical oscillator, comprising
    storing an ideal frequency-amplitude progression of a correct filling process as a reference measurement, and
    detecting a deviation in amplitude and frequency from this ideal frequency-amplitude progression as a malfunction.

20. A process according to claim 19, wherein filling the tank with wrong bulk goods is detected as a malfunction.

\* \* \* \* \*